United States Patent
Sulaiman et al.

(10) Patent No.: US 9,954,995 B2
(45) Date of Patent: Apr. 24, 2018

(54) END TO END DESIGN OF PERSONAL EMERGENCY SERVICE UTILIZING M2M CELLULAR, XMPP/XML TECHNOLOGIES ON MOBILE HELP BUTTON

(71) Applicant: KONINKLIJKE PHILIPS N.V., Eindhoven (NL)

(72) Inventors: Ameer Sulaiman, Murrysville, PA (US); Tomas Russ, Murrysville, PA (US); Jinyan Li, Murrysville, PA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/862,535

(22) Filed: Sep. 23, 2015

(65) Prior Publication Data

US 2016/0094967 A1   Mar. 31, 2016

Related U.S. Application Data

(60) Provisional application No. 62/055,279, filed on Sep. 25, 2014, provisional application No. 62/055,329, (Continued)

(51) Int. Cl.
| | |
|---|---|
| *H04W 4/22* | (2009.01) |
| *H04M 1/725* | (2006.01) |
| *H04W 24/04* | (2009.01) |
| *G01S 19/01* | (2010.01) |
| *H04W 4/04* | (2009.01) |

(Continued)

(52) U.S. Cl.
CPC ......... *H04M 1/72541* (2013.01); *G01S 19/01* (2013.01); *H04M 3/54* (2013.01); *H04M 3/56* (2013.01); *H04M 11/04* (2013.01); *H04W 4/005* (2013.01); *H04W 4/02* (2013.01); *H04W 4/021* (2013.01); *H04W 4/04* (2013.01); *H04W 4/22* (2013.01); *H04W 24/04* (2013.01); *H04W 52/0241* (2013.01); *H04W 76/007* (2013.01); *H04M 2242/04* (2013.01);

(Continued)

(58) Field of Classification Search
CPC ........ H04W 4/22; H04W 4/005; H04M 11/04
See application file for complete search history.

(56) References Cited

U.S. PATENT DOCUMENTS

| | | | |
|---|---|---|---|
| 6,725,044 B2 | 4/2004 | Verma et al. | |
| 8,866,606 B1 * | 10/2014 | Will | H04W 4/22 340/539.11 |

(Continued)

*Primary Examiner* — Myron K Wyche

(57) ABSTRACT

A mobile call device (10) for use in conjunction with a Personal Emergency Response System (PERS) includes a cellular radio (20) configured for voice communication (22) and data transmission (24) and a call button (12). The mobile call device is programmed to: send a machine-to-machine (M2M) message (52) from the cellular radio to a PERS call center (42) via a M2M server (40). The M2M message includes at least PERS subscriber or mobile call device identification information, and may further include current location information acquired by one or more locator services (28, 54) of the mobile call device. After sending the M2M message, the mobile call device is further programmed to receive and conduct a voice call (56) originating from the PERS call center. The mobile call device may be further programmed to initiate a voice call to a Public Safety Answering Point (70).

23 Claims, 2 Drawing Sheets

Related U.S. Application Data filed on Sep. 25, 2014, provisional application No. 62/055,308, filed on Sep. 25, 2014, provisional application No. 62/055,351, filed on Sep. 25, 2014.

(51) Int. Cl.
| | |
|---|---|
| *H04W 76/00* | (2018.01) |
| *H04W 4/02* | (2018.01) |
| *H04W 52/02* | (2009.01) |
| *H04M 3/54* | (2006.01) |
| *H04M 3/56* | (2006.01) |
| *H04W 4/00* | (2018.01) |
| *H04M 11/04* | (2006.01) |
| *H04W 84/04* | (2009.01) |
| *H04W 84/12* | (2009.01) |
| *H04W 88/06* | (2009.01) |

(52) U.S. Cl.
CPC ........ *H04W 84/042* (2013.01); *H04W 84/12* (2013.01); *H04W 88/06* (2013.01); *Y02B 60/50* (2013.01)

(56) References Cited

U.S. PATENT DOCUMENTS

| | | | |
|---|---|---|---|
| 2009/0143047 A1* | 6/2009 | Hays | H04M 11/04 455/404.2 |
| 2009/0157835 A1* | 6/2009 | Thompson | H02J 13/0017 709/206 |
| 2011/0059719 A1 | 3/2011 | Spielvogel et al. | |
| 2011/0092237 A1 | 4/2011 | Kato et al. | |
| 2013/0076510 A1 | 4/2013 | Bear et al. | |
| 2013/0137450 A1 | 5/2013 | Dai et al. | |
| 2013/0143519 A1 | 6/2013 | Doezema | |
| 2013/0311554 A1* | 11/2013 | Mahajan | H04W 4/005 709/204 |
| 2014/0142934 A1 | 5/2014 | Kim | |
| 2014/0189001 A1* | 7/2014 | Tyagi | H04W 4/005 709/204 |
| 2014/0206307 A1 | 7/2014 | Maurer et al. | |
| 2014/0274225 A1* | 9/2014 | Lacatus | H04W 24/08 455/574 |
| 2015/0254967 A1 | 9/2015 | Hyatt | |
| 2016/0093197 A1 | 3/2016 | See et al. | |

\* cited by examiner

END TO END DESIGN OF PERSONAL EMERGENCY SERVICE UTILIZING M2M CELLULAR, XMPP/XML TECHNOLOGIES ON MOBILE HELP BUTTON

FIELD

The following relates generally to the Personal Emergency Response System (PERS) arts and related arts.

BACKGROUND

A Person Emergency Response System (PERS) enables an elderly person or other person at elevated risk of incapacitating medical emergency to summon help. For example, a PERS may be activated by a person experiencing a debilitating fall, a heart attack, an acute asthma attack or other respiratory emergency, and so forth. The PERS typically includes a call button in the form of a necklace-worn pendant, a bracelet, or the like. By pressing the call button, a speakerphone console in the residence is activated, by which the at-risk person is placed into telephonic contact with a PERS call center operator. The PERS operator speaks with the calling person (hereinafter referred to as a PERS "subscriber" as the person subscribes with the PERS service, although any associated costs or fees may be paid by a medical insurance company or other third party), and takes appropriate action such as talking the subscriber through an asthma episode, summoning emergency medical service (EMS), dispatching a local PERS agent, neighbor, or other authorized person to check on the subscriber, or so forth. In providing assistance, the PERS operator has access to a subscriber profile stored on a PERS server, which provides information such as (by way of illustration) name, location, demographic information, a list of the person's known chronic conditions, a list of the person's medications, an identification of the nearest hospital, a list of emergency contacts (spouse, relative, friend), physician information, and so forth.

The PERS architecture typically assumes a homebound subscriber (where "home" may be an individual residence, a group residence, an apartment, an assisted care facility, or so forth). The assumption of a homebound subscriber enables use of lean PERS architecture. For example, in one PERS architecture, the call button is a low-power, short-range radio transmitter (e.g. operating at 900 MHz in some PERS) and the residential speakerphone console is connected to a telephone landline. Pressing the call button generates a radio signal that triggers the speakerphone console to connect with the call center. In this design, the call button is a simple device operating at very low power, and most of the system complexity at the residence end is built into the speakerphone console.

A disadvantage of this PERS architecture is that the PERS is only usable when the subscriber is in his or her residence.

The following discloses a new and improved systems and methods that address the above referenced issues, and others.

SUMMARY

In one disclosed aspect, a mobile call device is disclosed for use in conjunction with a Personal Emergency Response System (PERS). The mobile call device comprises a cellular radio configured for voice communication and data transmission, and a call button. The mobile call device is programmed to send a machine-to-machine (M2M) message from the cellular radio to a PERS call center via a M2M server wherein the M2M message includes at least PERS subscriber or mobile call device identification information, and to, after sending the M2M message, receive and conduct a voice call originating from the PERS call center.

In another disclosed aspect, a mobile call device is disclosed for use in conjunction with a Personal Emergency Response System (PERS). The mobile call device comprises: a cellular radio configured for voice communication and data transmission; a call button; one or more locator services configured to acquire a current location of the mobile call device; and a built-in speaker and microphone. The mobile call device further comprises an electronic processor programmed to: send a machine-to-machine (M2M) message from the cellular radio to a PERS call center via a M2M server wherein the M2M message includes at least PERS subscriber or mobile call device identification information and current location information acquired by the one or more locator services; and, after sending the M2M message, receive and conduct a voice call originating from the PERS call center using the cellular radio and the built-in speaker and microphone.

In another disclosed aspect, a method of placing an emergency call using a Personal Emergency Response System (PERS) is disclosed. The method comprises detecting activation of a mobile help button and transmitting an Extensible Messaging and Presence Protocol (XMPP) message from the mobile help button to a PERS call center via an XMPP server. After sending the XMPP message, a voice call originating from the PERS call center is received and conducted using the mobile help button.

One advantage resides in providing a mobile PERS architecture.

Another advantage resides in providing a mobile PERS architecture that is energy-efficient with extended battery life between recharging.

Another advantage resides in providing a subscriber-side PERS call device that is compact and energy efficient to promote mobility.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

In illustrative Personal Emergency Response System (PERS) embodiments described herein, the person served by the PERS service is referred to as a "subscriber". This recognizes that the at-risk person subscribes with the PERS service so that the subscriber's call button device or other PERS hardware are associated with the PERS service and appropriate subscriber data are stored at the PERS server. It is to be understood that the term "subscriber" has no further connotation—for example, any costs or fees associated with the PERS subscription of the subscriber may be paid by the subscriber, or by a medical insurance company, or by a governmental agency, or by some other third party.

Figure 1:
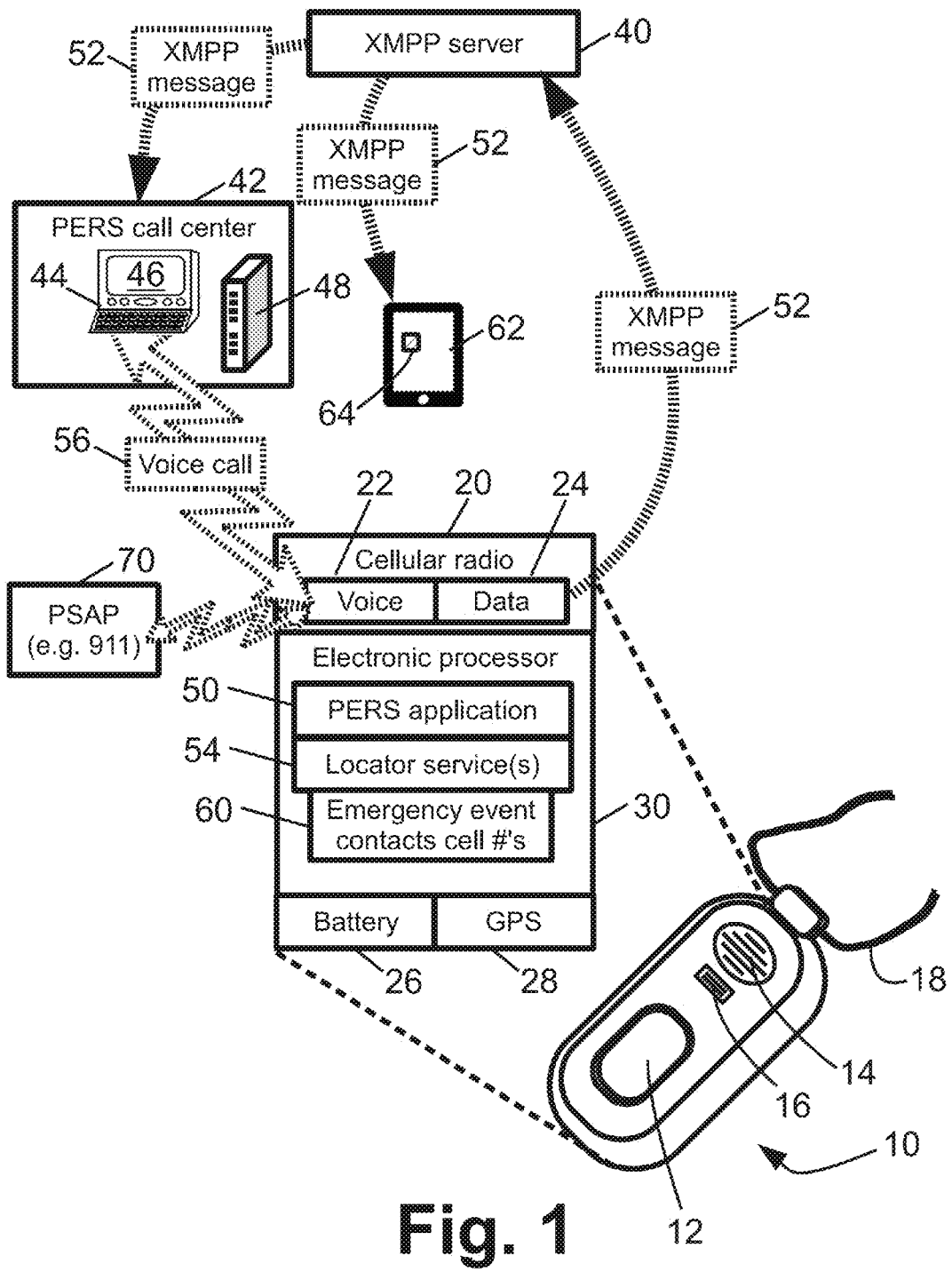
FIG. 1 diagrammatically illustrates a mobile Personal Emergency Response System (PERS).

With reference to FIG. 1, an illustrative mobile Personal Emergency Response Service (PERS) for providing emergency response to a subscriber is described. The subscriber carries or wears a wearable call device 10 which includes a call button 12, a speaker 14, and a microphone 16. The illustrative wearable call device 10 is a pendant that is worn around the neck via a necklace 18 (shown in part). More generally, the wearable call device is a unitary device that can have any suitable wearable form factor, such as the illustrative necklace-worn pendant, or a bracelet or wristband mount, or so forth, and includes simple and effective mechanism such as the illustrative push button 12 for triggering a call to a PERS call center. The call device 10 is suitably battery-powered to enable complete portability. While the illustrative (preferably large) push button 12 is a convenient call trigger mechanism, other call trigger mechanisms are contemplated, such as a voice-activated trigger mechanism. It is also contemplated to provide a wearable call device that automatically triggers a call based on certain input. For example, the wearable call device 10 may include an accelerometer and/or other movement sensors (not shown), and the call device 10 triggers a call upon the accelerometer detecting a rapid downward acceleration indicative of a sudden fall event. The wearable call device 10 optionally has other attributes such as optionally being waterproof so it can be worn in a bath or shower. Because the call device 10 is designed to be operated by the subscriber under duress, possibly including compromised physical or mental agility, the call device 10 is preferably designed to minimize operational complexity and likelihood of operator error. For example, in some embodiments the call device 10 includes only the call button 12 and no other user controls, and the call button 12 is preferably large with a tactile surface to facilitate its activation by the subscriber even if the subscriber's hand is trembling or the subscriber has vision difficulty, pain, or is otherwise debilitated.

FIG. 1 diagrammatically illustrates internal components of the PERS call device 10, including a cellular radio 20 with a voice component 22 and a data component 24, a battery 26, a Global Positioning System (GPS) unit 28, and an electronic processor 30 (e.g. a microprocessor or microcontroller). It will be appreciated that these components may be variously integrally formed and/or mounted separately or as combined units in the housing of the call device 10. For example, various groups of components 20, 26, 28, 30 may be commonly mounted as a hybrid integrated circuit, monolithic integrated circuit, or so forth.

The cellular radio 20 is configured to wirelessly communicate via a cellular network providing both voice communication and data transfer. This is diagrammatically indicated in FIG. 1 by the voice and data components 22, 24, which may have varying levels of integration, e.g. a common transceiver may be used for both voice and data. The cellular radio 20 communicates via a cellular network (not shown) comprising cellular network towers, satellite links, or so forth. The cellular network provides wide area coverage, e.g. nationwide coverage in the case of national cellular telephone networks.

The illustrative PERS of FIG. 1 further includes or utilizes a machine-to-machine (M2M) messaging server 40, and further includes a PERS call center 42. The illustrative M2M messaging server 40 employs Extensible Messaging and Presence Protocol (XMPP), which is a connection-oriented M2M messaging protocol based on XML. Thus, the server 40 is an XMPP server. It should be noted that the XMPP server 40 may be a dedicated PERS messaging server, or alternatively may be a commercial XMPP server with which the PERS provider contracts with and utilizes to provide XMPP messaging support for the PERS.

The PERS call center 42 is staffed by call center agents, who are preferably trained to handle emergency events by telephonic communication with the subscriber experiencing the emergency event. The call center 42 includes computerized agent terminals, of which one illustrative call terminal computer 44 is shown by way of example. Each call terminal 44 includes a display 46 for displaying subscriber information during an emergency event being handled by the call center agent, and a microphone/speaker, speakerphone, headset or the like (not shown) for conducting telephone calls with subscribers. The PERS call center 42 further includes a routing computer 48 or other electronic call routing device registered with the XMPP server 40 to receive (and optionally also send) XMPP messages. The routing computer 48 routes emergency calls received from subscribers as XMPP messages to available PERS call terminals for handling by PERS call center agents.

With returning attention to the call device 10, the electronic processor 30 is programmed to execute a PERS application 50, which detects activation of the call button 12 (or detects another emergency call trigger such as an accelerometer signal or other sensor signal indicative of a sudden fall) and operates the cellular radio 20 to transmit a machine-to-machine (M2M) data message, namely an XMPP message 52 in the illustrative embodiment, to initiate an emergency call in response to the detected trigger. The XMPP message 52 is a M2M message addressed to the PERS call center 42 (or, more particularly, to its routing computer 48) in accordance with the XMPP protocol, and the XMPP server 40 relays the XMPP message 52 to the PERS call center 42. The XMPP message 52 includes relevant information such as the subscriber identification (and/or, additionally or alternatively, a device identification of the call device 10), a current location of the subscriber determined by one or more geographical locator services 54 of the call device 10, and optionally other relevant information such as accelerometer data (if the call device 10 includes an on-board accelerometer). The locator service(s) 54 may, for example, include the optional GPS unit 28, and/or a web-based geographical locator service such as Skyhook™ (Boston, Mass., USA) that correlates cellular network towers detected using the cellular radio 20 with geographical location. More precisely, the locator service(s) 54 determine the current location of the call device 10, on the assumption that it is on the person of the subscriber (i.e. worn by the subscriber as a necklace, wristband, or so forth).

At the PERS call center 42, the routing computer 48 assigns the XMPP message 52 a case number for auditing purposes, reads the XMPP content to determine the subscriber identity and current location (and any other information included in the XMPP message 52), and routes the emergency event call to an available PERS call terminal 44, where the subscriber's information and emergency event information read from the XMPP message 52 are displayed on the display component 46 for review by the call center agent. To reduce energy and bandwidth cost to the call device 10 associated with the M2M transmission, the XMPP message 52 is preferably kept short. To this end, in some embodiments a subscriber/call device identification information contained in the XMPP message 52 is low, and the routing computer 48 stores or accesses a subscriber database to retrieve subscriber information such as subscriber name and demographic information (e.g. age, gender, ethnicity), a telephone number of the voice component 22 of the subscriber's call device 10, the subscriber's residence address, chronic medical conditions (if any) of the subscriber, the subscriber's physician contact information, and so forth. Alternatively, some of this information may be contained in the XMPP message 52.

The illustrative embodiment of FIG. 1 uses the XMPP server 40 for transmission of the M2M emergency alert transmission 52. In other embodiments, another messaging protocol such as Short Message Service (SMS) text messaging or Multimedia Messaging Service (MMS) multimedia messaging may be used. A disadvantage of SMS or MMS is that the M2M server supporting these services is typically controlled by the cellular network operator (e.g. cellular telephone service provider). The cellular network operator usually provides SMS or MMS service on a "best effort" delivery basis, in which message delivery may be delayed and is not guaranteed. By contrast, XMPP is decentralized and the XMPP server 40 can be a dedicated server controlled and run by the PERS provider, or a private XMPP server contracted by the PERS provider under contractual terms that ensure guaranteed XMPP message delivery in a specified time frame. The XMPP protocol also provides a high degree of flexibility in formatting the message content as compared with SMS which is text-only with a 160 character message limit, or MMS which is geared toward transmission of images or other multimedia content.

As a M2M message, transmission of the XMPP message 52 does not place the calling subscriber into voice contact with a call center agent. Rather, it is the responsibility of the call center agent to initiate a voice call 56 to the calling subscriber. To do so, the call center operator operates a voice call component of the call center computer 44 to initiate the voice call 56 to a telephone number assigned to the voice component 22 of the cellular radio 20 of the call device 10. Typically, this number is a conventional telephone number, e.g. of the form (###) ###-#### in the United States where (###) is a three-digit area code and ###-#### is the phone number. The PERS application 50 receives the voice call 56 and operates the speaker 14 and microphone 16 of the call device 10 to conduct conversation between the PERS call center operator and the subscriber.

The disclosed mobile PERS has numerous advantages. Power consumption at the call device 10 is low, as the device need only transmit the (preferably short) XMPP message 52 and handle the subsequently received voice call 56. In the illustrative embodiment, the call device 10 is not programmed to originate a voice call to the PERS call center 42, which again reduces complexity and power consumption at the call device 10. Rather, the voice call 56 originates from the PERS call center 42 in response to receiving the M2M data message 52. Similarly, the number of components in the call device 10 is low. The same cellular radio 20 handles both the M2M transmission and the voice call. Since the call device 10 does not need to monitor for incoming calls except after transmitting the XMPP message 52, the cellular radio 20 is optionally normally turned off to conserve battery life. (Optionally, the normally off cellular radio 20 may be turned on occasionally, e.g. once a week, for a brief time in order to transmit a "check-in" message to the call center 42). The locator service(s) 28, 54 may also be turned off most of the time, although occasional location updates are preferably performed at least whenever the subscriber (or, more precisely, the call device 10) is in motion to provide a recent location in case locator service(s) fail at the time an emergency call is placed by pressing the call button 12. The XMPP message 52 carries relevant information (possibly augmented by subscriber data retrieved by the router computer 48) to the PERS call center agent before the agent initiates the voice call 56, so that the agent has relevant information in order to effectively assist the subscriber. By assigning each XMPP message 52 a case number, auditing of the handling of subscriber calls is facilitated.

Another advantage of the disclosed mobile PERS is that it can incorporate notification of trusted third parties, such as a spouse, a relative, a neighbor, or so forth, without substantial modification of the PERS architecture. Such extension to notification of trusted third parties leverages the fact that M2M transmissions using protocols such as XMPP can be addressed to multiple recipient machines. In the illustrative example of FIG. 1, one or more trusted third parties are identified by a list of cellular telephone number(s) 60 of mobile devices carried by the trusted third party or parties. Alternatively, the third party mobile device identification can be by way of device Internet Protocol (IP) address or another M2M protocol-compliant device identification. Each trusted third party mobile device, such as the illustrative tablet computer 62, is registered with the XMPP server 40. At the call device 10, the list of additional recipient device identifications 60 is added to the XMPP message 52 (along with the address of the PERS routing computer 48), and consequently the XMPP server 40 also relays the XMPP message 52 to each mobile device 62 on the recipient devices list 60 stored at the call device 10. The trusted third party's mobile device 62 is configured to run a PERS application 64 ("app") that reads the XMPP message 52 and displays its content on the display component of the mobile device 62. A suitable notification alarm (visual and/or audio) may also be activated to alert the third party. Advantageously, transmission of the XMPP message 52 to the third party's mobile device 62 is via a M2M transmission from the call device 10 of the subscriber. The PERS call center 42 (and more particularly the routing computer 48) is not involved in this M2M transmission—accordingly, the third party will be notified of the emergency alert initiated by the call device 10 even if for some reason the PERS call center 42 is unable to receive the XMPP message 52 or respond appropriately. The third party receipt of the XMPP message 52 is dependent only on reliability of the XMPP server 40 (which can be made virtually failsafe by appropriate redundancies and other measures known in the art for ensuring virtually continuous server up-time) and operational status of the cellular network and the third party's mobile device 62.

In some embodiments, the PERS application 50 executing on the processor 30 can operate the voice component 22 of the cellular radio 20 to initiate a call to a Public Safety Answering (or Access) Point (PSAP) 70, such as a "911"-call center in the United States. In one approach, the call center agent can initiate a call to the PSAP 70 remotely via XMPP, and the resulting call is a conference call between the PSAP 70 and the call center operator and the subscriber. Remote activation could, for example, be implemented from the call center terminal computer 44 by way of a dedicated PERS client running on the call device 10 that is controlled from the call center operator via XMPP commands (or, more generally, M2M messages) to send commands such as to cause the call device 10 to call the PSAP 70. Use of such a remotely controlled PERS client provides a high degree of flexibility in performing a range of remote operations. In another approach, the remote request to call the PSAP 70 may be executed by injecting a distinctive audio signal into the voice call 56 that is detected by the running PERS application 50 and recognized as a request to call PSAP 70. It should be noted that the call to the PSAP 70 typically must be initiated from the cellular radio 20 of the call device 10 of the subscriber in order to ensure that the call goes to the PSAP location that is closest to the current location of the subscriber. (By contrast, if the call center agent were to call PSAP directly, he or she would reach the PSAP location closest to the call center operator, who may be very far away from the subscriber). It is additionally or alternatively contemplated for the call device 10 to be programmed to automatically call the PSAP 70 on its own if it is unable to communicate with the PERS call center 42.

Figure 2:
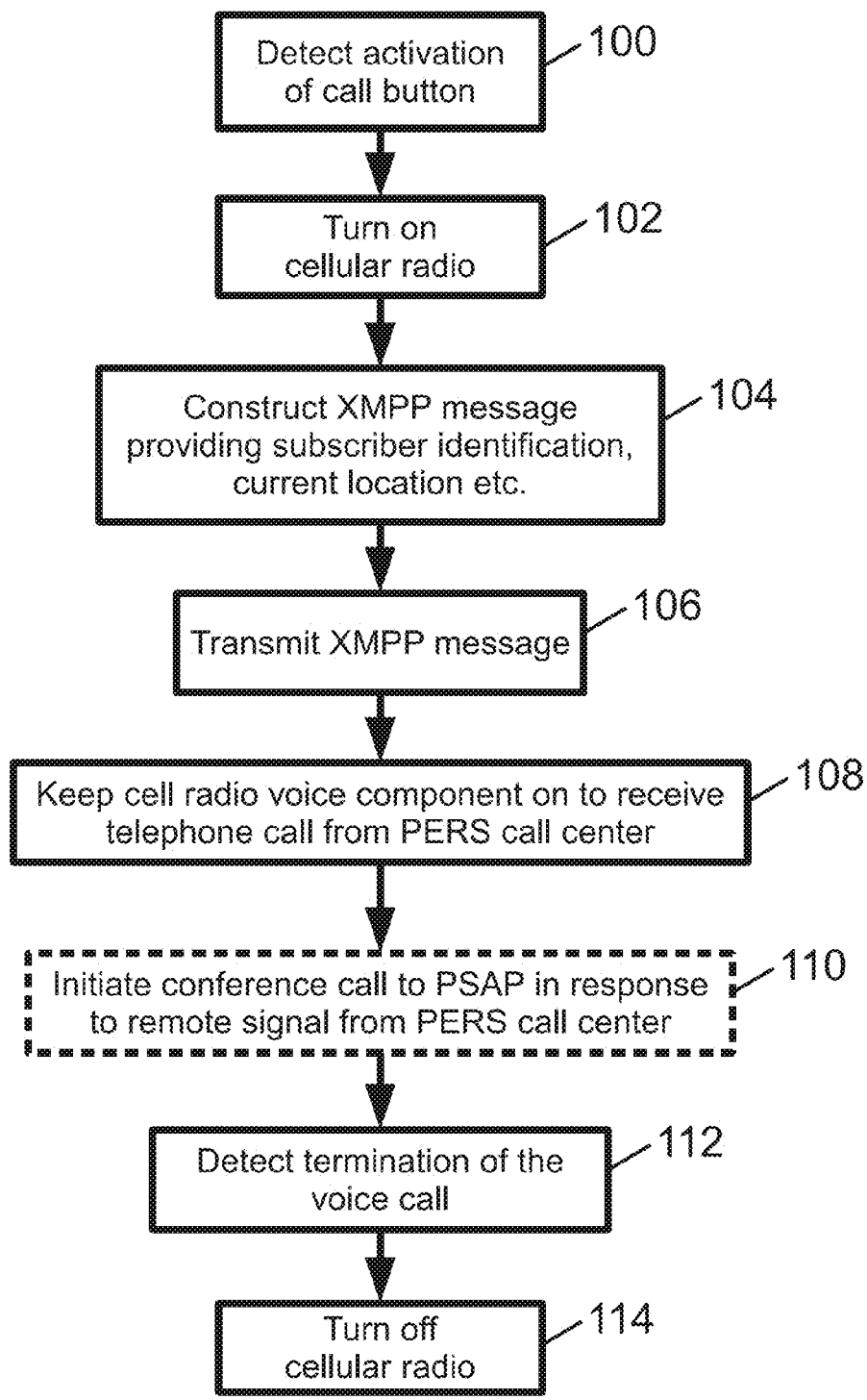
FIG. 2 diagrammatically illustrates emergency event processing suitably performed by the mobile PERS of FIG. 1.

With reference now to FIG. 2, an illustrative example of emergency event processing suitably performed by the mobile PERS of FIG. 1 (and more particularly by the call device 10) is described. In an operation 100, activation of the call button 12 by the subscriber is detected, which indicates the subscriber intends to initiate an emergency call. In an operation 102 the cellular radio 20 is turned on (assuming it is normally off to conserve battery power), and in a subsequent or concurrent operation 104 the XMPP message 52 is constructed. The operation 104 may include retrieving information such as subscriber or call device identification from FLASH memory or another electronic storage, obtaining a current location from the locator service(s) 54, retrieving accelerometer data or other patient sensor data from sensor storage, or so forth, and constructing the XMPP message 52 including such data. The operation 104 also includes incorporating address information for the routing computer 48 and, optionally, for other devices stored in the third party emergency contacts list 60, in XMPP protocol. In an operation 106 the XMPP message 52 is transmitted to the routing computer 48 and to any third party addressees. In an operation 108, after transmitting the XMPP message 52 the voice component 22 (at least) of the cellular radio 20 is kept turned on in order to receive the expected telephone call from the PERS call center agent in response to the XMPP message 52. In an optional operation 110, a call to the PSAP 70 may be initiated in response to a remote signal received at the call device 10 from the call center operator. In an operation 112, termination of the voice call 56 is detected, and in response to this termination the cellular radio 20 is turned off in an operation 114. In an alternative approach, the hang-up operation 112 is replaced by a requirement to receive an affirmative termination signal from the call center operator before the cellular radio is turned off in the operation 114. This alternative approach has the advantage of keeping the cellular radio 20 on in the event that the voice call 56 is inadvertently terminated (for example, inadvertently "dropped" by the cellular network) so that the call center agent can call back to the subscriber to re-start the voice call 56.

Thus, in some embodiments an embedded XMPP client runs on the call device 10, using very limited resources, such as memory, power etc. During an alarm (i.e. emergency event indicated by the subscriber pressing the call button 12), the call device 10 (i.e. mobile help button 10, 12) uses an M2M cellular module connected to the PERS back-end, sending information 52 like identification, location, status info etc. Thereafter, voice communication 56 is established between the subscriber and a PERS agent (i.e. Personal Response Associate, PRA), located in the Call Center 42. The disclosed approaches for establishing XMPP/XML client on the mobile help button (MHB) 10, 12 addresses the problem of limited resource memory and power at the mobile help button 10, 12. In some embodiments, the cellular radio 20 is off most of the time, and is only turned on when there is an alarm. The mobile help button 10, 12 then connects to back-end XMPP server 40 and sends information 52 like identification, location, status info etc. After that, the PRA calls the cellular radio 20 of the MHB 10. Moreover, the MHB 10 can also dial the phone number of the emergency services, PSAP 70, to establish a conference call between the emergency services and the Call Center operator. After the alarm issue is resolved, the MHB 10 turns off the cellular module 20. This provides a lean and flexible protocol using cellular and XMPP/XML technologies by building a client running on the MHB 10 that can communicate with back-end's XMPP server 40 to exchange information.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A wearable mobile call device for use in conjunction with a Personal Emergency Response System (PERS), the wearable mobile call device comprising:
   a cellular radio configured for voice communication and data transmission; and
   a call button;
   wherein the wearable mobile call device is configured to worn by a user and is programmed to:
   send a machine-to-machine (M2M) message from the cellular radio to a PERS call center via a M2M server wherein the M2M message includes at least PERS subscriber or wearable mobile call device identification information; and
   after sending the M2M message, receive and conduct a voice call originating from the PERS call center.

2. The wearable mobile call device of claim 1 wherein the wearable mobile call device is not programmed to originate a voice call to the PERS call center.

3. The wearable mobile call device of claim 1 further comprising:
   a speaker and microphone built into the wearable mobile call device for conducting the voice call.

4. The wearable mobile call device of claim 1 further comprising:
   one or more locator services configured to acquire a current location of the wearable mobile call device;
   wherein the M2M message further includes current location information acquired by the one or more locator services.

5. The wearable mobile call device of claim 1 wherein the wearable mobile call device is programmed to keep the cellular radio normally turned off and to turn on the cellular radio to send the M2M message and receive and conduct the voice call.

6. The wearable mobile call device claim 1 wherein the wearable mobile call device is further programmed to initiate a voice call to a Public Safety Answering Point (PSAP) in response to one or both of an M2M message received from the PERS call center via the M2M server commanding a call to the PSAP and failure to receive the voice call originating from the PERS call center.

7. The wearable mobile call device of claim 6 wherein after initiating the voice call to the PSAP the wearable mobile call device is further programmed to establish a conference call between the PSAP and the PERS call center.

8. The wearable mobile call device of claim 1 wherein:
the wearable mobile call device is configured to store one or more emergency contacts including at least a cellular telephone number or other M2M-compliant mobile device identification for each emergency contact; and
the wearable mobile call device is programmed to send the M2M message addressed to the PERS call center and to the cellular telephone number or other M2M-compliant mobile device identification of each emergency contact stored in the wearable mobile call device.

9. The wearable mobile call device of claim 1 wherein the M2M server is an Extensible Messaging and Presence Protocol (XMPP) server and the wearable mobile call device is programmed to send the M2M message comprising an XMPP message from the cellular radio to the PERS call center via the XMPP server.

10. A Personal Emergency Response System (PERS) comprising:
a PERS call center including an electronic call routing device;
a machine-to-machine (M2M) server; and
a wearable mobile call device as set forth in claim 1.

11. A wearable mobile call device for use in conjunction with a Personal Emergency Response System (PERS), the wearable mobile call device comprising:
a cellular radio configured for voice communication and data transmission;
a call button;
one or more locator services configured to acquire a current location of the wearable mobile call device, which is configured to be worn by a user;
a built-in speaker and microphone; and
an electronic processor programmed to:
send a machine-to-machine (M2M) message from the cellular radio to a PERS call center via a M2M server wherein the M2M message includes at least PERS subscriber or wearable mobile call device identification information and current location information acquired by the one or more locator services; and
after sending the M2M message, receive and conduct a voice call originating from the PERS call center using the cellular radio and the built-in speaker and microphone.

12. The wearable mobile call device of claim 11 wherein the wearable mobile call device is not programmed to originate a voice call to the PERS call center.

13. The wearable mobile call device of claim 11 wherein the wearable mobile call device includes no other user control besides the call button.

14. The wearable mobile call device of claim 11 wherein the wearable mobile call device is further programmed to initiate a voice call to a Public Safety Answering Point (PSAP).

15. The wearable mobile call device of claim 14 wherein after initiating the voice call to the PSAP the wearable mobile call device is further programmed to conduct a conference voice call between the PSAP and the PERS call center.

16. The wearable mobile call device of claim 11 wherein:
the wearable mobile call device is configured to store one or more emergency contact M2M-compliant mobile device addresses; and
the wearable mobile call device is programmed to send the M2M message addressed to the PERS call center and to each emergency contact M2M-compliant mobile device address stored in the wearable mobile call device.

17. The wearable mobile call device of claim 11 wherein the wearable mobile call device is programmed to send the M2M message as an Extensible Messaging and Presence Protocol (XMPP) message from the cellular radio to the PERS call center via the M2M server.

18. A Personal Emergency Response System (PERS) comprising:
a PERS call center including an electronic call routing device;
an Extensible Messaging and Presence Protocol (XMPP) server; and
a wearable mobile call device as set forth in claim 11 wherein the wearable mobile call device is programmed to send the M2M message in XMPP from the cellular radio to the PERS call center via the XMPP server.

19. A method of placing an emergency call using a Personal Emergency Response System (PERS), the method comprising:
detecting activation of a mobile help button of a wearable call device and transmitting an Extensible Messaging and Presence Protocol (XMPP) message from the mobile help button to a PERS call center via an XMPP server; and
after sending the XMPP message, receiving and conducting a voice call originating from the PERS call center using the mobile help button.

20. The method of claim 19 further comprising:
keeping cellular communication of the mobile help button off;
turning on the cellular communication of the mobile help button in response to detecting activation of the mobile help button and performing the transmitting and the receiving and conducting with the turned on cellular communication.

21. The method of claim 19 further comprising:
placing a voice call to a Public Safety Answering Point (PSAP) using cellular communication of the mobile help button.

22. The method of claim 21 further comprising:
establishing a conference call between the PSAP and the PERS call center.

23. The method of claim 19 wherein the transmitting comprises:
transmitting the XMPP message from the mobile help button addressed to the PERS call center and to at least one emergency contact mobile device via the XMPP server.

* * * * *